Figures 1, 2:
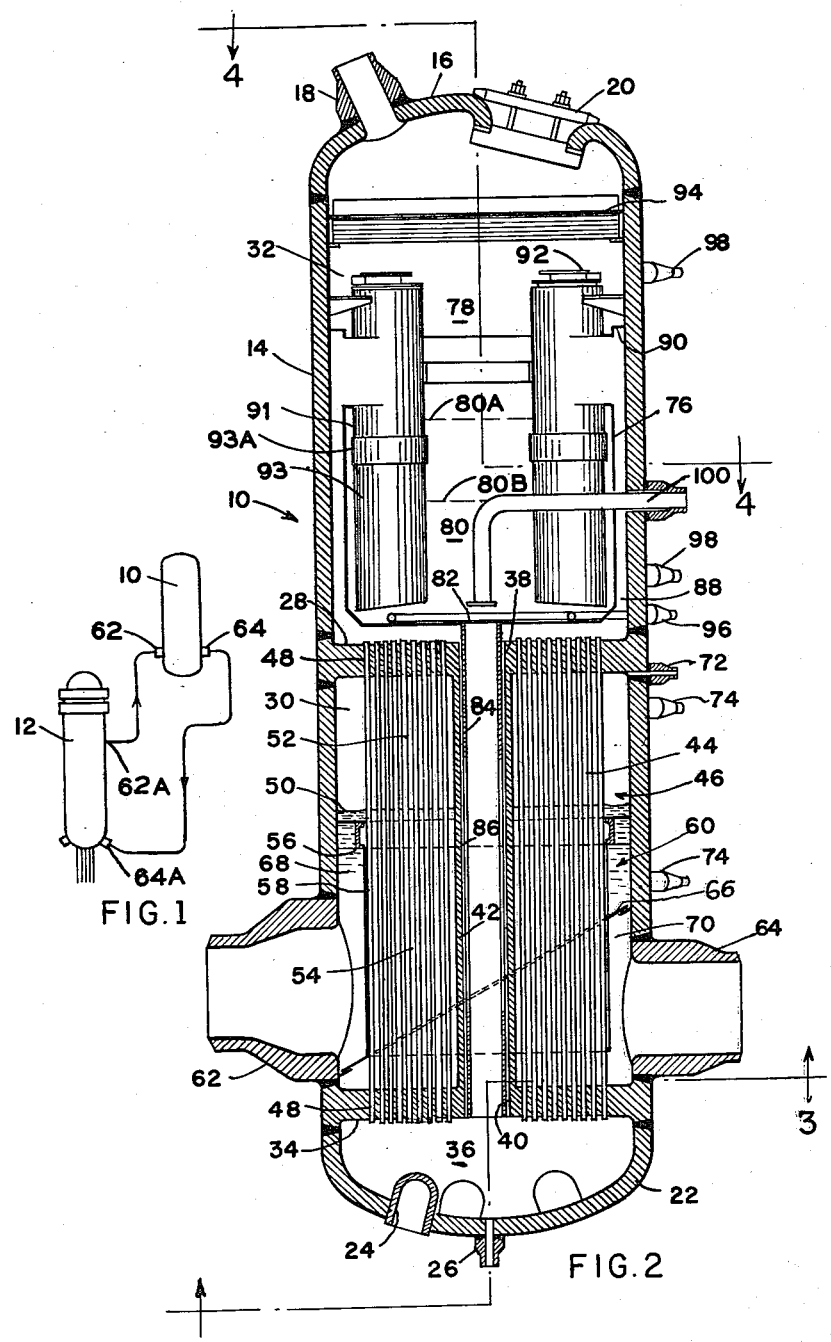

Dec. 17, 1963    T. S. SPRAGUE    3,114,353
VAPOR GENERATING UNIT AND METHOD OF OPERATING SAME
Filed June 25, 1959    2 Sheets-Sheet 1

INVENTOR.
THEODORE S. SPRAGUE
BY
ATTORNEY

Dec. 17, 1963 T. S. SPRAGUE 3,114,353
VAPOR GENERATING UNIT AND METHOD OF OPERATING SAME
Filed June 25, 1959 2 Sheets-Sheet 2

INVENTOR.
THEODORE S. SPRAGUE
BY
ATTORNEY

United States Patent Office 3,114,353
Patented Dec. 17, 1963

3,114,353
VAPOR GENERATING UNIT AND METHOD OF OPERATING SAME
Theodore S. Sprague, Hudson, Ohio, assignor to The Babcock & Wilcox Company, New York, N.Y., a corporation of New Jersey
Filed June 25, 1959, Ser. No. 822,968
10 Claims. (Cl. 122—34)

This invention relates in general to a vapor generating unit, and more particularly to a vapor generating unit wherein a first fluid heats a second-fluid while the first fluid is being condensed and sub-cooled.

The invention is particularly adapted to be used in a closed cycle boiling water nuclear reactor system. In such a reactor system the primary coolant in flowing through the reactor core becomes a vapor-liquid mixture which imparts heat to a secondary fluid by indirect heat transfer to produce a vapor-liquid mixture. The secondary fluid then passes to a point of use where it may be utilized for heating, generation of electrical power, or other purposes.

The vapor generating unit of the present invention provides a solution to a number of problems which have faced the designers of boiling water reactors. One, is the avoidance of radioactive carryover from the reactor. By preventing any contact between the primary or first fluid and the secondary fluid, the possibility of radioactive products from the reactor contaminating those portions of the reactor system in contact with the secondary fluid is greatly reduced. Second, by providing a system in which the flow of first fluid is produced by natural circulation means the need for costly circulating pumps is obviated. Third, a method of controlling a boiling water reactor can be achieved by varying the degree of sub-cooling of the first fluid.

Accordingly, the present invention provides a method in which the first fluid comprising a vapor-liquid mixture is used to heat a second fluid. Initially, the heated first fluid is separated into its vapor and liquid portions. The vapor portion then flows in indirect heat transfer relationship with the second fluid to complete the heating thereof. While completing the heating of the second fluid, the vapor portion of the first fluid is condensed and mixes with the liquid portion, which is flowing in indirect heat transfer relationship with the second fluid, thus causing it to become partially heated while the liquid portion is being sub-cooled. In its path of flow, the second fluid is contacted initially by the liquid portion of the first fluid, and then by the vapor portion of the first fluid.

Additionally, the present invention contemplates a heat exchanger comprising a pressure vessel having a normal liquid level therein which provides a vapor space above a body of liquid. Heat exchange surfaces are positioned within both the vapor space and the body of liquid in the pressure vessel. The primary or heating fluid enters and leaves the pressure vessel through connections located below the liquid level. The fluid to be heated, i.e. the secondary fluid, is introduced into the heat exchange surfaces at a point below the liquid level and the resultant heated fluid is removed from the heat exchange surfaces above the liquid level.

Further, the heating fluid is directed in its path of flow through the pressure vessel so that it separates into its vapor and liquid portions. The vapor portion passing over the heat exchange surfaces in the vapor space is condensed and then mixes with the liquid portion, flowing downwardly over the heat exchange surfaces below the liquid level in the pressure vessel.

Various features of novelty which characterize the invention are pointed out with particularity in the claims annexed to and forming part of this specification. For a better understanding of the invention, its operating advantages and specific objects attained by its use, reference should be had to the accompanying drawings and descriptive matter in which a certain specific embodiment of the invention is illustrated and described.

Figure 4:
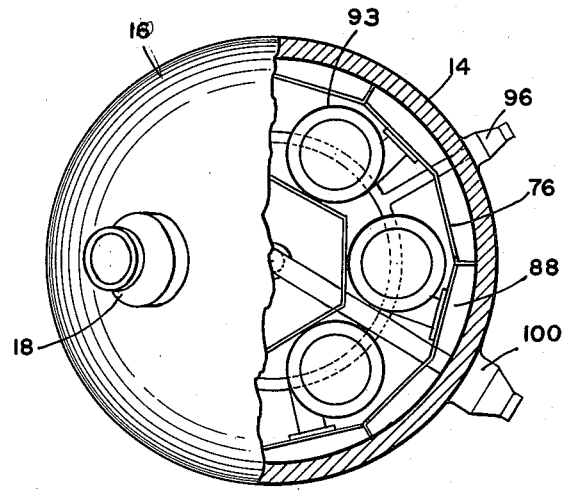
Figure 3:
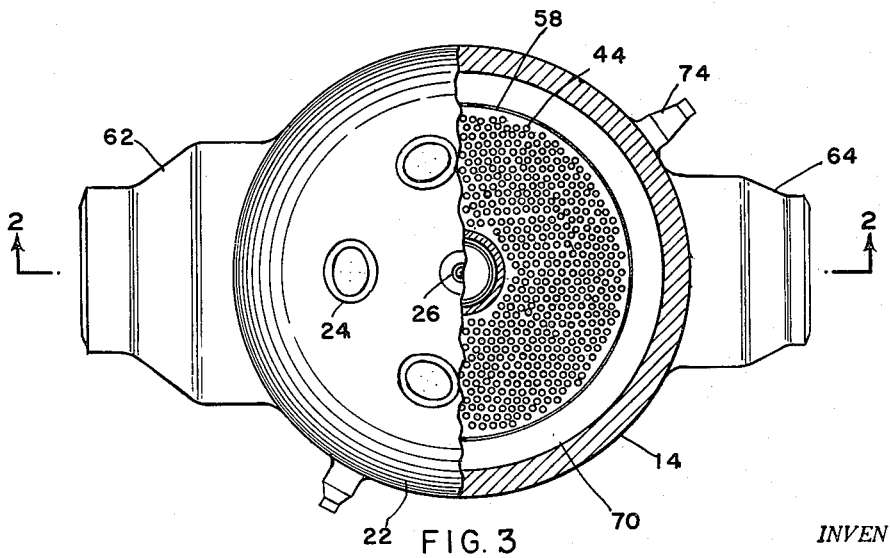

Of the drawings:
FIG. 1 is a schematic diagram, showing in elevation the vapor generating unit arranged in a boiling water reactor system;
FIG. 2 is a vertical cross sectional view of the preferred embodiment of the vapor generating unit;
FIG. 3 is an enlarged view partially in section taken along the line 3—3 in FIG. 2; and
FIG. 4 is an enlarged view partially in section taken along the line 4—4 of FIG. 2.

In FIG. 1 there is illustrated a vapor generating unit 10 arranged to receive a primary steam-water mixture from the core of a boiling water nuclear reactor 12. The primary water flows in a closed cycle through the reactor and the vapor generating unit removing heat produced within the reactor core by the fission chain reaction, and then giving up this heat in the vapor generating unit. Vapor generating unit 10 is positioned vertically above the reactor 12 so that the primary water flow through the closed cycle reactor system will be produced by natural circulation means. The primary water is sub-cooled within the vapor generating unit and is most dense in the cycle as it leaves the unit. As indicated by the arrows in FIG. 1 the sub-cooled primary water flows from the outlet 64 in the bottom of the vapor generating unit into the inlet connection 64A in the base of the reactor 12.

It then flows upwardly through the reactor, absorbing heat as it passes through the core, and forming a steam-water mixture which exits at outlet 62A located above the core and then flows upwardly entering the vapor generating unit via inlet 62. On its passage through the vapor generating unit, the primary steam-water mixture, in the process of giving up the heat it absorbed in the reactor, is condensed and sub-cooled, for its continuous recirculation through the closed cycle boiling water nuclear reactor system.

Sub-cooling as used herein means that the primary water is cooled below the temperature at which the vapor and water exist in thermodynamic equilibrium, for a specific pressure.

The vapor generating unit 10 in FIG. 2 consists of a vertically elongated pressure vessel 14 closed at the top by an upper dish shaped head 16 having a secondary vapor outlet 18 and a normally closed manway 20 therein. At the bottom there is a lower dish shaped head 22 containing a number of handholes 24 and a secondary system drain connection 26. An upper tube sheet 28 is transversely arranged within and integrally attached to the vessel wall and divides the unit into a lower steam generating section 30 and an upper steam-water separating section 32.

In the lower portion of the steam generating section a lower tube sheet 34 integrally attached to the vessel walls is positioned in parallel relationship with the upper tube sheet. The lower tube sheet in combination with the lower head, from which it is closely spaced, forms a secondary water inlet chamber 36. A pair of axially aligned centrally positioned openings 38, 40 are located in the upper and lower tube sheets respectively. A sleeve 42 is connected at its opposite ends to the upper and lower tube sheets and communicates between the openings 38, 40 respectively in the tube sheets.

A bundle of steam generating tubes 44 is arranged in an annular shaped space 46 bounded horizontally by the upper and lower tube sheets 28, 34 and vertically by the wall of the pressure vessel 14 and sleeve 42. The steam generating tubes are spaced from the pressure vessel wall and are secured at their opposite ends into tube seats 48 within the tube sheets. During the operation of the vapor generating unit 10 a normal water level 50 is maintained intermediate the ends of the tubes in the annular shaped space 46 to provide a steam space 52 above the body of primary water 54 therein.

At approximately the location of the normal liquid level a transversely arranged tube support ring 56 is positioned between the pressure vessel wall and the bundle of tubes. A tube shroud 58 closely surrounding the bundle of steam generating tubes extends downwardly from the tube support ring to a horizontal plane spaced a short distance above the lower tube sheet. The tube shroud and pressure vessel wall combine to form an annular flow passage 60 therebetween. An inlet 62 diverging as it enters the pressure vessel is located in the steam generating section and supplies a primary steam-water mixture into the lower end of the flow passage 60. Diagonally opposite the inlet 62 an outlet 64 is situated to discharge primary water from the flow passage. An inclined annular shaped baffle 66 is located in and forms a seal across the flow passage 60, and is attached to the pressure vessel on one side at a point just below the inlet 62 and on the opposite side at a point above the outlet 64. In this way it divides the flow passage into an inlet portion 68 and an outlet portion 70 so that the primary steam-water mixture, upon entering through the inlet 62, flows upwardly through the annular inlet portion 68 with the steam disengaging at the water level 50, and the water flowing downwardly over the steam generating tubes within the tube shroud into the outlet portion 70, and then leaving the pressure vessel through outlet 64.

A vent connection 72 is situated in the pressure vessel at a point just below the upper tube sheet communicating with the steam space of the steam generating section to remove non-condensible gases which might collect in the primary system. The steam generating section also has a pair of primary water gage glass connections 74, one disposed above and the other below the normal liquid level 50.

In the steam-water separating section 32 a cup shaped collector baffle 76 is spaced inwardly from the pressure vessel wall 14 and above the upper tube sheet 28. The collector baffle also defines the secondary water space 80 and in part the steam space 78. An outlet opening 82 is centrally located in the bottom of the collector baffle in axial alignment with the opening 38 in the upper tube sheet. A downcomer 84 is connected at its upper end to the outlet opening 82 and extends downwardly through the sleeve 42 terminating at the bottom face of the lower tube sheet 34. There is a narrow, annular flow path 86 formed between the downcomer and the sleeve which extends between and through the lower and upper tube sheets.

A riser passageway 88 is formed by the collector baffle 76, the upper tube sheet 28 and the vessel wall 14. This passageway which extends upwardly from the upper tube sheet is enclosed around the top by an annular shaped plate 90. Six circumferentially arranged cyclone type steam separators 91 are spaced about the inner periphery of the collector baffle to receive the steam-water mixture from the riser passageway 88. These steam separators have their upper ends located in the secondary steam space 78 and extend downwardly into the body of water 80. A steam distributor plate 92 is positioned on top of each of the separators to deflect any water escaping from the top of the separators downwardly into the water space 80.

The separated water exits from the steam separators through an extension section 93 attached to the separator by means of a connecting band 93A. At its outlet end, the opening from the discharge sleeve is positioned just above the bottom of the collector baffle and is biased to direct the flow inwardly toward the opening 82 to the downcomer. In the secondary steam space 78 above the steam separators, there is a corrugated type secondary steam scrubber element 94.

A blowdown connection 96 is situated in the pressure vessel communicating with the body of secondary water in the water space 80. A pair of secondary water gage glass connections 98 are located in the steam-water separating section with one connection opening to the secondary steam space 78 and the other to the secondary water space 80. In addition, there is a secondary water conduit 100 which supplies feed water to the unit. The outlet of this conduit is positioned directly above the opening to the downcomer 84 so that the incoming feed water mixes intimately with the secondary water issuing from the bottom of the steam separator extension section 93.

The preferred embodiment of the vapor generating unit 10 described herein operates in the following manner. First, the primary steam-water mixture heated in the core leaves the boiling water reactor 12 through the outlet connection 62A and enters the vapor generating unit 10 through the inlet 62 and is directed upwardly by the baffle 66 through the inlet portion 68 of the flow passage 60. The primary steam-water mixture effects some degree of separation in the region of the normal water level 50, with the primary steam rising upwardly into the steam space 52 and the primary water flowing downwardly over the steam generating tube 44, confined in its flow path by the tube shroud 58. In the steam space 52 the primary steam flows in indirect heat transfer relationship with the secondary water flowing upwardly through the steam generating tubes 44. As it flows over the steam generating tubes, the primary steam is condensed and then mixes with the primary water which is flowing downwardly within the confines of the tube shroud in indirect heat transfer relationship with the steam generating tubes contained therein. After its passage through the shroud, the primary water flows out under the shroud into the outlet portion 70 of the flow passage 60 and is discharged from the vapor generating unit through the outlet 64. In the course of flowing over the steam generating tubes below the normal water level 50, the primary water is sub-cooled to the desired temperature before it leaves the pressure vessel. As can be seen in FIG. 1, from the outlet 64 the sub-cooled primary water flows to the reactor 12 entering at inlet connection 64A to complete its closed cycle passage through the reactor and the vapor generating unit.

Secondary water which is to be vaporized within the steam generating section 30 flows downwardly through the downcomer 84 from the water space 80 to the secondary water inlet chamber 36. To avoid generating steam in the downcomer, which would interfere with the natural circulation of the secondary water in the vapor generating unit, a small amount of secondary water is circulated through the annular flow path 86 between the downcomer 84 and the sleeve 42. In addition to avoiding steaming the interposition of the secondary water in the annular flow path protects the sleeve from thermal shock caused by the difference in temperature between the primary steam and water flowing on one side of the sleeve and the secondary water flowing in the downcomer.

From the inlet chamber 36 the main body of the secondary water flows upwardly through steam generating tubes 44 in counter-flow and indirect heat transfer relationship with the primary steam and water. Steam is generated in the secondary water as it passes first through the body of primary water 54 and then through the steam space 52. Upon leaving the steam generating tubes, the secondary steam-water mixture enters the riser passageway 88 and flows upwardly therethrough into the steam separators 91. Upon separation of the steam and water, the secondary steam flows upwardly from the top of the separator and then through the corrugated steam scrubber 94 where substantially all of the entrained moisture is removed, and finally through the outlet 18 to a point of use (not shown).

Meanwhile, the secondary water passes downwardly through the extension section 93 and flows into the water space 80, being directed inwardly across the bottom of the container toward the opening 82 to the downcomer 84. The level of secondary water in the water space is maintained between a high and low water level 80A, 80B to assure a head of water above the outlet from the extension section 93 of the separators 91. Feedwater is supplied to the secondary steam generating system through the conduit 100 and flows downwardly toward the upper end of the downcomer. As it is discharged from the conduit, the secondary feedwater mixes intimately with the secondary water flowing from the separators and thereby condenses any steam bubbles which might be entrained therein. This assures steam free secondary water, which provides the operating force or head for the natural circulation of the secondary water through the vapor generating unit.

The following table contains a typical example of the operating conditions for the steam generating section of the embodiment just described.

|  | Primary Water | Secondary Water |
| --- | --- | --- |
| Operating Pressure, p.s.i.g. | 900 | 600 |
| Inlet Temperature, °F | 533 | 350° (feedwater) |
| Outlet Temperature, °F | 514 | 497 |
| Steam Quality, Percent | 3.5 | 2.5 |

In the vapor generating unit of the present invention, the primary fluid is kept out of contact with the secondary fluid thereby avoiding any radioactive carryover directly from the primary steam-water mixture to the secondary steam-water mixture. By avoiding this radioactive carryover, the danger of contamination of the turbine or the other pieces of equipment in the secondary fluid portion of the boiling water nuclear reactor system is greatly reduced.

The arrangement of the vapor generating unit in the present invention when used in combination with the boiling water reactor permits the primary water to flow by means of natural circulation through the reactor and the vapor generating unit. Since the primary water flows by means of natural circulation it is not necessary to use circulating pumps, thereby obviating the need for this equipment. This advantage also holds true for the secondary water which flows by means of natural circulation through the vapor generating unit.

Further, in the present invention by regulating the degree of sub-cooling of the primary water within the vapor generating unit the boiling water nuclear reactor may be controlled. Boiling water nuclear reactors have a negative temperature coefficient of reactivity which means simply as the temperature of the coolant or primary water increases, by reactivity of the reactor core is reduced. Therefore, by controlling the temperature range of the primary water as it flows through the reactor core, the quantity of reactivity or power level of the reactor may be regulated. This may be accomplished in the present invention by varying the water level in the steam generating section 30 to increase or decrease the amount of sub-cooling or by by-passing a fraction of the primary or secondary water to accomplish this same effect. Gage glass connections 74 and 98 are located in the steam generating and the steam-water separating sections of the vapor generating unit respectively to indicate the water levels therein.

In addition to the preferred embodiment illustrated and described herein, it would be possible to use the general arrangement of this invention in several other embodiments. One of these would be to combine the boiling water reactor and the secondary steam generating portion in a single pressure vessel. In such an arrangement, shielding would be disposed between the core and the superjacent secondary steam generating tubes. The primary steam-water mixture would flow upwardly from the core to the upper portion of the pressure vessel and then downwardly over the secondary steam generating tubes. A secondary steam-water separating arrangement, similar to that in the preferred embodiment, could be used with the alternate embodiment just described, or else a steam drum could be situated outside of the reactor containment to separate the secondary steam from the steam water mixture as it is received from the vapor generating unit.

Another alternate embodiment would be to place the vapor generating sections and the vapor-liquid separating sections in separate vessels in vertical alignment connected by a combination downcomer-riser conduit. The secondary fluid would be vaporized by the primary fluid within the lower vapor generating section then passing upwardly through the conduit into the vapor-liquid separating section. From the vapor-liquid separating section the separated secondary vapor would flow to a point of use and the separated secondary liquid would return to the vapor generating unit. This arrangement has the advantage that the separating section of the unit could be positioned outside of the reactor containment, thereby making it available for maintenance, while the reactor is in operation.

This present invention has been described in combination with a boiling water reactor, however, those skilled in the art will realize that this vapor generating unit is not restricted to use with a nuclear reactor but may be used in any non-nuclear arrangement where one fluid is used to heat or vaporize a second fluid.

While in accordance with the provisions of the statutes I have illustrated and described herein the best form of the invention now known to us, those skilled in the art will understand that changes may be made in the form of the apparatus disclosed without departing from the spirit of the invention covered by my claims, and that certain features of my invention may be sometimes used to advantage without a corresponding use of other features.

What is claimed:

1. A method of heating a fluid wherein a first fluid, which has been heated, comprising a vapor-liquid mixture flowing in a continuous cycle is used to heat a second fluid, the method comprising separating the vapor portion and the liquid portion of the first fluid, flowing the vapor portion of the first fluid in indirect heat transfer relationship with the second fluid to provide a substantial proportion of the heat necessary to complete the heating of the second fluid while condensing the vapor portion of the first fluid, mixing the condensed vapor portion and the liquid portion of the first fluid, and flowing the mixed liquid portion of the first fluid in indirect heat transfer relationship with the second fluid at a position upstream in the direction of flow of said second fluid from the position where the vapor portion of the first fluid flows in indirect heat transfer relationship with the second fluid to partially heat the second fluid while subcooling the first fluid.

2. A method of generating vapor wherein a first fluid, which has been heated, comprising a vapor-liquid mixture flowing in a continuous cycle is used to vaporize a second fluid, the method comprising separating the vapor portion and the liquid portion of the first fluid, flowing the vapor portion of the first fluid in indirect heat transfer relationship with the second fluid to provide a substantial proportion of the heat necessary to complete the vaporization of the second fluid and thereby condensing the vapor portion of the first fluid, mixing the condensed vapor portion and the liquid portion of the first fluid, flowing the mixed liquid portion of the first fluid in indirect heat transfer relationship with the second fluid at a position upstream in the direction of flow of said second fluid from the position where the vapor portion of the first fluid flows in indirect heat transfer relationship with the second fluid to partially vaporize the second fluid while subcooling the first fluid, separating the vapor portion and the liquid portion of the second fluid, passing the vapor portion of the second fluid to a point of use, adding additional liquid to the liquid portion of the second fluid, and recirculating it in indirect heat transfer relationship with the first fluid.

3. A method of generating steam wherein the primary steam-water mixture from a boiling water nuclear reactor flowing in a continuous cycle is used to vaporize secondary water comprising separating the primary steam-water mixture, flowing the separated primary steam in indirect heat transfer relationship with the secondary water to provide a substantial proportion of the heat necessary to complete the vaporization thereof while condensing the primary steam, mixing the condensed primary steam and primary water, and flowing the mixed primary water in indirect heat transfer relationship with the secondary water at a position upstream in the direction of flow of said second fluid from the position where the primary steam flows in indirect heat transfer relationship with the secondary water to partially vaporize the secondary water while subcooling the remixed primary water.

4. A vapor generating unit comprising a vapor generating section and a vapor-liquid separating section, wall means enclosing said vapor generating section, an upper and a lower tube sheet transversely arranged within said wall means in spaced relationship, a plurality of vapor generating tubes extending between said upper and lower tube sheets, a normal liquid level arranged within said vapor generating section intermediate the ends of said vapor generating tubes and providing a vapor space above a body of liquid therein, a substantial proportion of the length of said vapor generating tubes disposed within said vapor space, a heating fluid inlet and a heating fluid outlet communicating with the body of liquid in said vapor generating section for the continuous circulation therethrough of a heating fluid comprising a vapor-liquid mixture, the heating fluid vapor-liquid mixture separating within the vapor generating section with the vapor component thereof entering the vapor space therein for flow over the vapor generating tubes, said vapor-liquid separating section comprising a vessel, a cup shaped collector baffle positioned within and spaced from said vessel, said collector baffle arranged to operate containing a vapor space above a body of liquid, said vessel and collector baffle coacting to form a vaporizable fluid vapor-liquid passageway receiving a vapor-liquid mixture from said vapor generating tubes, a vapor-liquid separator positioned within said collector baffle to receive the vaporizable fluid vapor-liquid mixture from said passageway and to discharge vapor directly to said vapor space and liquid directly to the body of liquid within said collector baffle, a vapor outlet from said vapor-liquid separating section, an inlet connection for supplying vaporizable fluid to the body of liquid within said collector baffle, and means for supplying the vaporizable fluid from the body of liquid within said collector baffle to the vapor generating tubes.

5. A vapor generating unit comprising walls forming a vertically arranged pressure vessel having an upper and a lower head, said vessel divided into a lower vapor generating section and an upper vapor-liquid separating section by a transversely arranged upper tube sheet, a transversely arranged lower tube sheet spaced below said upper tube sheet, a plurality of vapor generating tubes extending between and connected to said lower and upper tube sheets, a normal liquid level arranged within said vapor generating section intermediate the ends of said vapor generating tubes to provide therein a vapor space above a body of liquid, a substantial proportion of the length of said vapor generating tubes disposed within said vapor space, a heating fluid inlet and a heating fluid outlet in said pressure vessel below the normal liquid level in the vapor generating section for the continuous circulation therethrough of a heating fluid comprising a vapor-liquid mixture, the heating fluid vapor-liquid mixture separating within the vapor generating section with the vapor component thereof entering the vapor space therein for flow over the vapor generating tubes, baffle means for directing the flow of the heating fluid over the vapor generating tubes, said vapor-liquid separating section comprising a cup shaped collector baffle positioned within and spaced from the walls of said pressure vessel and arranged to operate containing a vapor space above a body of liquid therein, a passageway formed between said collector baffle and the walls of said pressure vessel to receive a vaporizable fluid vapor-liquid mixture from said vapor generating tubes, separating means arranged within said collector baffle to receive and separate the vapor-liquid mixture from said passageway and to discharge vapor directly to the vapor space and liquid directly to the bottom of the body of liquid within said collector baffle, and means to supply vaporizable fluid to said vapor generating tubes.

6. A vapor generating unit comprising walls forming a vertically arranged pressure vessel having an upper and a lower head, said vessel divided into a lower vapor generating section and an upper vapor-liquid separating section by a transversely arranged upper tube sheet, a transversely arranged lower tube sheet spaced below said upper tube sheet, a sleeve extending between and joined to said lower and upper tube sheets, a plurality of vertically extending vapor generating tubes arranged between said sleeve and the walls of said pressure vessel and extending between and connected to said lower and upper tube sheets, a normal liquid level arranged within said vapor generating section intermediate the ends of said vapor generating tubes to provide therein a vapor space above a body of liquid, a substantial proportion of the length of said vapor generating tubes disposed within said vapor space, a heating fluid inlet and a heating fluid outlet in said pressure vessel below the normal liquid level in the vapor generating section for the continuous circulation therethrough of a heating fluid comprising a vapor-liquid mixture, the heating fluid vapor-liquid mixture separating within the vapor generating section with the vapor component thereof entering the vapor space therein for flow over the vapor generating tubes, baffle means for directing the flow of heating fluid from said heating fluid inlet upwardly within the vapor generating section exteriorly of the vapor generating tubes to a point interjacent said upper and lower tube sheets and then downwardly over the vapor generating tubes to the heating fluid outlet, said vapor-liquid separating section comprising a cup shaped collector baffle positioned within and spaced from the walls of said pressure vessel and arranged to operate containing a vapor space above a body of liquid therein, a passageway formed between said collector baffle and the walls of said pressure vessel to receive a vaporizable fluid vapor-liquid mixture from the upper ends of said vapor generating tubes, separating means arranged within said collector baffle to receive and separate the vapor-liquid mixture from said passageway and to discharge vapor directly to the vapor space and liquid directly to the bottom of the body of liquid within said collector baffle, and a downcomer extending downwardly from said collector baffle through said sleeve to said lower tube sheet to supply vaporizable fluid to the lower ends of said vapor generating tubes.

7. A vapor generating unit comprising walls forming a vertically arranged pressure vessel having an upper and a lower head, said vessel divided into a lower vapor generating section and an upper vapor-liquid separating section by a transversely arranged upper tube sheet, a transversely arranged lower tube sheet spaced below and in parallel relationship with said upper tube sheet, a circular sleeve extending between and attached to said lower and upper tube sheets, a plurality of vertically extending vapor generating tubes arranged between said sleeve and the walls of said pressure vessel and extending between and connected to said lower and upper tube sheets, a normal liquid level arranged within said vapor generating section intermediate the ends of said vapor generating tubes to provide therein a vapor space above a body of liquid, a substantial proportion of the length of said vapor generating tubes disposed within said vapor space, a heating fluid inlet and a heating fluid outlet in said pressure vessel below the normal liquid level in the vapor generating section for the continuous circulation therethrough of a heating fluid comprising a vapor-liquid mixture, the heating fluid vapor-liquid mixture separating within the vapor generating section with the vapor component thereof entering the vapor space therein for flow over the vapor generating tubes, baffle means for directing the flow of heating fluid from said heating fluid inlet upwardly within the vapor generating section exteriorly of the vapor generating tubes to a point interjacent said upper and lower tube sheets and then downwardly over the vapor generating tubes to the heating fluid outlet, said lower tube sheet and the lower head of said pressure vessel coacting to form a vaporizable fluid inlet chamber, said vapor-liquid separating section comprising a cup shaped collector baffle positioned within and spaced inwardly from the walls of said pressure vessel and above the upper tube sheet, said collector baffle arranged to operate containing an upper vapor space above a body of liquid therein, a riser passageway formed between said collector baffle, the upper tube sheet and the walls of the pressure vessel to receive a vaporizable fluid vapor-liquid mixture from the upper ends of said vapor generating tubes, separating means arranged within said collector baffle to receive and separate the vapor-liquid mixture from said passageway and to discharge vapor directly to the vapor space and liquid directly to the bottom of the body of liquid within said collector baffle, and a downcomer positioned within and spaced from said sleeve and extending downwardly from said collector baffle to the vaporizable fluid inlet chamber to deliver vaporizable fluid thereto.

8. A steam generating unit for use in a boiling water nuclear reactor system to generate secondary steam comprising a vertically elongated pressure vessel of circular cross-section having an upper and a lower head, said pressure vessel divided into a lower steam generating section and an upper steam-water separating section by a transversely arranged upper tube sheet integrally attached to the pressure vessel, a lower tube sheet spaced below and in parallel relationship with said upper tube sheet and integrally attached to the pressure vessel, said lower tube sheet located closely above said lower head and forming therewith a secondary water inlet chamber, a first opening centrally located through said upper tube sheet, a second opening centrally located through said lower tube sheet, a vertically arranged sleeve connected to and extending between said upper and lower tube sheets and communicating between said first and second openings, an annular shaped bundle of vertically arranged steam generating tubes positioned between said pressure vessel and sleeve and extending between and connected to said lower and upper tube sheets, a normal water level arranged within said steam generating section intermediate the ends of said steam generating tubes to provide therein a primary steam space above a body of primary water, a substantial proportion of the length of said steam generating tubes disposed within said primary steam space, a tube support ring joined to the pressure vessel and arranged about said bundle of steam generating tubes at approximately the normal water level, a shroud disposed about said bundle of steam generating tubes and extending downwardly from said tube support ring to a horizontal plane spaced above said lower tube sheet, said shroud spaced from said pressure vessel to form a flow passage therebetween, baffle means disposed in said flow passage to direct flow therein, a primary steam-water inlet in said pressure vessel below the normal water level to deliver a primary steam-water mixture to said flow passage therein above said baffle means for its continuous circulation therethrough, the primary steam-water mixture separating within the steam generating section with the steam component therein entering the steam space therein for flow over said steam generating tubes, a primary water outlet in said pressure vessel diagonally opposite said primary steam-water inlet to receive primary water from the flow passage below said baffle means, a vent connection in said pressure vessel communicating with said primary steam space, said vapor-liquid separating section comprising a cup shaped collector baffle positioned within and spaced from said pressure vessel and above the upper tube sheet, said collector baffle arranged to operate containing a secondary steam space above a body of secondary water therein, an enclosed passageway formed between said collector baffle and the upper tube sheet and pressure vessel to receive a secondary steam-water mixture from the upper ends of said steam generating tubes, a ring of cyclone steam separators arranged within and about the circumference of said container to receive and separate the secondary steam-water mixture from said enclosed passageway and to discharge secondary steam directly to the secondary steam space and secondary water directly to the body of secondary water in said container, a steam scrubber disposed transversely within the steam-water separating section to dry the secondary steam discharging from said steam separators, a secondary steam outlet located in the upper head of said pressure vessel, a secondary feedwater inlet conduit emptying into the body of secondary water in said container, a secondary water blowdown connection connected to said container, a downcomer positioned within and spaced from said sleeve and extending downwardly from the bottom of said container to the secondary water inlet chamber to deliver secondary water thereto, an annular shaped flow path formed between said downcomer and sleeve and communicating between said secondary water inlet chamber and passageway, a pair of primary water gage glass connections connected to the steam generating section of said pressure vessel, and a pair of secondary water gage glass connections connected to the steam-water separating section of said pressure vessel.

9. A vapor generating system wherein a first fluid flowing in a continuous cycle is heated and is used to vaporize a second fluid comprising a unit containing a heat source for heating the first fluid to a vapor-liquid mixture, a heat exchanger spaced from said unit, said heat exchanger comprising a pressure vessel having a normal liquid level therein providing a vapor space above a body of liquid, heat exchange tubes each having an upper portion and a lower portion arranged within said vessel, each of said upper and lower portions comprising a substantial proportion of the tube length, the upper portion of said tubes located within said vapor space, the lower portion of said tubes located within said body of liquid, a first conduit connected at one end to said unit and at its opposite end to said heat exchanger below the liquid level therein for delivering a vapor-liquid mixture of said first fluid from said unit to said heat exchanger wherein it is separated into its vapor and liquid components, means for introducing the second fluid to the ends of the lower portion of said heat exchange tubes, and separator means disposed within said pressure vessel above said liquid level and arranged to receive a vapor-liquid mixture of the second fluid after it completes its passage through said heat exchange tubes.

10. A vapor generating system wherein a first fluid flowing in a continuous cycle is heated and is used to vaporize a second fluid comprising a unit containing a heat source for heating the first fluid to a vapor-liquid mixture, a heat exchanger spaced from said unit, said heat exchanger comprising a pressure vessel having a normal liquid level therein providing a vapor space above a body of liquid, heat exchange tubes each having an upper and a lower portion arranged within said vessel, each of said upper and lower portions comprising a substantial proportion of the tube length, the upper portion of said tubes located within said vapor space, the lower portion of said tubes located within said body of liquid, a first conduit connected at one end to said unit and at its opposite end to said heat exchanger below the liquid level therein for delivering a vapor-liquid mixture of said first fluid from said unit to said heat exchanger wherein it is separated into its vapor and liquid components, means for introducing the second fluid to the ends of the lower portion of said heat exchange tubes, baffle means arranged in said pressure vessel below the liquid level therein for directing the flow of the first fluid, and separator means disposed within said pressure vessel above said liquid level and arranged to receive a vapor-liquid mixture of the second fluid after it completes its passage through said heat exchange tubes.

References Cited in the file of this patent

UNITED STATES PATENTS

| | | |
|---|---|---|
| 548,986 | Hewitt | Oct. 29, 1895 |
| 1,067,010 | Dunn | July 8, 1913 |
| 1,564,716 | Ruths | Dec. 8, 1925 |
| 1,604,280 | Haag | Oct. 26, 1926 |
| 1,959,286 | Grebe | May 15, 1934 |
| 2,862,479 | Blaser et al. | Dec. 2, 1958 |